United States Patent
Andersson et al.

(10) Patent No.: US 8,032,080 B2
(45) Date of Patent: Oct. 4, 2011

(54) WIRELESS COMMUNICATION MIMO SYSTEM WITH REPEATERS

(75) Inventors: Mats H Andersson, Göteborg (SE); Bo Göransson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 679 days.

(21) Appl. No.: 12/096,749

(22) PCT Filed: Dec. 8, 2005

(86) PCT No.: PCT/SE2005/001874
§ 371 (c)(1),
(2), (4) Date: Jun. 9, 2008

(87) PCT Pub. No.: WO2007/067107
PCT Pub. Date: Jun. 14, 2007

(65) Prior Publication Data
US 2008/0293358 A1    Nov. 27, 2008

(51) Int. Cl.
*H04B 7/15* (2006.01)
(52) U.S. Cl. ......... 455/11.1; 455/13.1; 455/7; 455/13.3; 455/16
(58) Field of Classification Search ............ 455/7, 9, 455/11.1, 101, 65, 20, 422, 562, 8, 562.1, 455/68, 434, 67.11, 436, 63.1, 452.1, 41.2, 455/501, 452.2, 13.3; 375/267, 347, 211, 375/260; 370/315, 342, 252, 328, 329, 331, 370/332, 238; 343/700, 702, 753, 895
See application file for complete search history.

(56) References Cited

U.S. PATENT DOCUMENTS

| | | | | |
|---|---|---|---|---|
| 6,466,766 | B1* | 10/2002 | Treatch | 455/20 |
| 2002/0085643 | A1* | 7/2002 | Kitchener et al. | 375/267 |
| 2005/0054318 | A1* | 3/2005 | Fujii et al. | 455/272 |
| 2005/0130587 | A1* | 6/2005 | Suda et al. | 455/9 |
| 2006/0035605 | A1* | 2/2006 | Ozluturk et al. | 455/101 |
| 2007/0010196 | A1* | 1/2007 | Periyalwar et al. | 455/7 |
| 2008/0279135 | A1* | 11/2008 | Periyalwar et al. | 370/315 |
| 2009/0209212 | A1* | 8/2009 | Cetiner et al. | 455/90.2 |

FOREIGN PATENT DOCUMENTS
WO    WO 2005064872 A1    7/2005

OTHER PUBLICATIONS

Rankov, B et al: "On the capacity of relay-assisted wireless MIMO channels" In: Signal Processing Advances in Wireless Communications, 2004 IEEE 5th Workshop on, Jul. 11-14, 2004, pp. 323-327. See sections I, III, figure 2 and abstract.

* cited by examiner

Primary Examiner — Tan Trinh

(57) ABSTRACT

The present invention relates to a wireless communication system (C) comprising at least one base station (1) in a communication cell (2), from which base station (1) at least two essentially uncorrelated antenna radiation lobes (7, 8, 9, 10) are formed. Each antenna radiation lobe (7, 8, 9, 10) communicates a MIMO (Multiple Input Multiple Output) communication stream. The system (C) further comprises at least one repeating transmitter/receiver (repeater) (18, 19, 20, 21), which is arranged for communicating one of the MIMO communication streams to and/or from at least one UE (user equipment) (12). The present invention also relates to a repeater that is a part of the system (C), and a method for communicating at least two MIMO communication streams to and/or from at least one UE (user equipment) (12), using at least one repeater (18, 19, 20, 21).

11 Claims, 2 Drawing Sheets

WIRELESS COMMUNICATION MIMO SYSTEM WITH REPEATERS

TECHNICAL FIELD

The present invention relates to a wireless communication system comprising at least one base station in a communication cell, from which base station at least two essentially uncorrelated antenna radiation lobes are formed, each antenna radiation lobe communicating a MIMO (Multiple Input Multiple Output) communication stream.

The present invention also relates to repeating transmitter/receiver (repeater).

The present invention also relates to a method for communicating at least two MIMO communication streams to and from at least one UE (user equipment), comprising the step: communicating the MIMO communication streams by means of at least two at least two essentially uncorrelated antenna radiation lobes.

BACKGROUND ART

The demand for wireless communication systems has grown steadily, and is still growing, and a number of technological advancement steps have been taken during this growth. In order to acquire increased system capacity and user bit rate for wireless systems by employing uncorrelated propagation paths, MIMO (Multiple Input Multiple Output) systems have been considered to constitute a preferred technology for improving the capacity. MIMO employs a number of separate independent signal paths, for example by means of several transmitting and receiving antennas. Each path communicates a communication stream.

In order for a MIMO system to function efficiently, uncorrelated, or at least essentially uncorrelated, transmitted signals are required. The meaning of the term "uncorrelated signals" in this context is that the radiation patterns are essentially orthogonal. This is made possible for one antenna if that antenna is made for receiving and transmitting in at least two orthogonal polarizations, i.e. polarization diversity. Antennas for MIMO systems may also utilize spatial separation, i.e. physical separation, in order to achieve low correlation between the received signals at the antenna ports. It is also possible to combine spatial separation with polarization diversity, i.e. having at least two antennas separated by 5-10 wavelengths (calculated from the centre frequency of the frequency band for which the antennas are designed), which antennas also are arranged for transmission and reception of signals having orthogonal polarizations.

A base station in a MIMO system may thus be arranged with a number of antennas, separated by 5-10 wavelengths, each one of the base station antennas either being designed for one polarization or two orthogonal polarizations.

However, in an urban environment, where a user equipment (for example a mobile phone or a portable computer) is arranged for communicating with such a base station, a number of objects such as large buildings may block the signal path between the base station and the user equipment, causing a number of reflections. Therefore, the signal to noise ratio (SNR) becomes deteriorated, and thus the signals transmitted between the base station and the user equipment become more and more noisy the more buildings that are in the way.

In WO 2005/064872 a repeater system is described, where a base station having multiple antennas communicates via relay stations. The relay stations relay signals to the user equipment via a number of separate channels, where the channelization for example is in the frequency or time domain. This solution presents a problem, since, if the frequency domain is used, there is a shortage of frequencies to be used due to spectral shortage. If the time domain is used, the system becomes slow.

DISCLOSURE OF THE INVENTION

The objective problem that is solved by the present invention is to provide an arrangement suitable for a MIMO system, which arrangement is capable of providing sufficient communication between a base station having at least two spatially separated antennas and a user equipment also having at least two spatially separated antennas, when a number of obstacles are situated in the signal path, deteriorating the SNR. Furthermore, the solution should provide an arrangement which improves the SNR for the MIMO communication streams, also leading to a larger coverage area for the use of MIMO.

This objective problem is solved by means of a system as mentioned in the introduction, where the system further comprises at least one repeating transmitter/receiver (repeater), the at least one repeater being arranged for communicating one of the MIMO communication streams to and/or from at least one UE (user equipment), the UE being equipped with at least two essentially uncorrelated antenna functions.

This objective problem is also solved by means of a repeater as mentioned in the introduction, where the repeater is a part of said system.

This objective problem is solved by means of a method as mentioned in the introduction, where the method the method further comprises the step: using at least one repeating transmitter/receiver (repeater) for communicating at least one of the MIMO communication streams to the UE.

Preferred embodiments are disclosed in the dependent claims.

Several advantages are achieved by means of the present invention, for example:

improvement of the SNR for the MIMO communication streams increased coverage are for the use of MIMO.

BRIEF DESCRIPTION OF THE DRAWINGS

The present invention will now be described more in detail with reference to the appended drawing, where.

PREFERRED EMBODIMENTS

Figure 1:
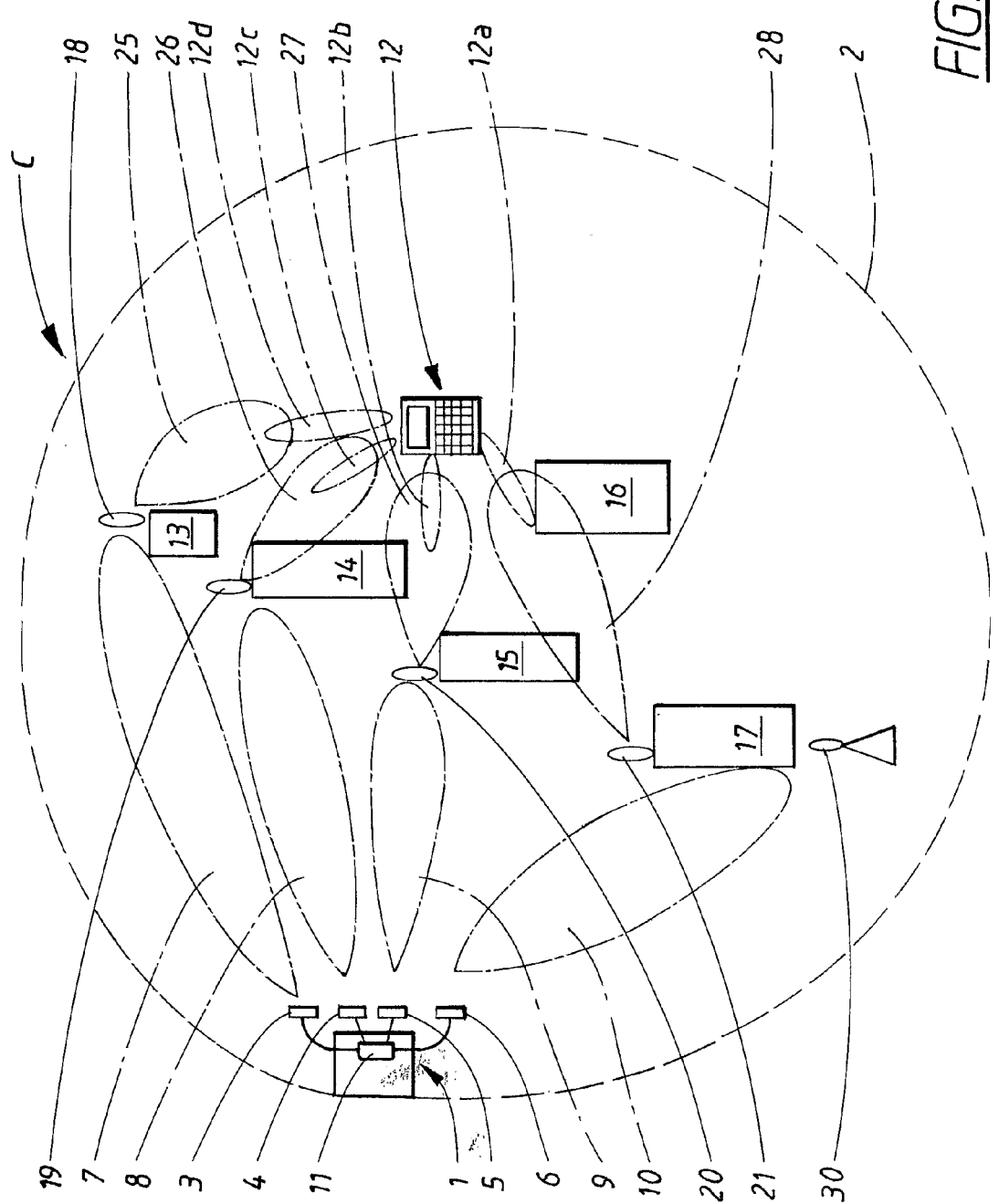
FIG. 1 shows a schematic view of the system according to the present invention.

FIG. 1 shows a wireless communication system (C) comprising a base station 1 arranged for communication in a MIMO (Multiple Input Multiple Output) system is placed in such a way that it covers a communication cell 2. According to a first embodiment example, the base station 1 is equipped with a first 3, second 4, third 5 and fourth 6 antenna, which antennas are spatially separated by approximately 0.5-1 wavelengths (calculated from the centre frequency of the frequency band for which the antennas are designed). In this example, each antenna 3, 4, 5, 6 is arranged for a single polarization. The four antennas 3, 4, 5, 6 produce first 7, second 8, third 9 and fourth 10 antenna radiation lobes.

These antennas 3, 4, 5, 6 receive and transmit signals, using the same frequency band for the uplink and another frequency band for the downlink. The spatial separation is, in a previously known manner, adapted in such a way that the communicated signals in the respective antenna lobes 7, 8, 9, 10 are essentially uncorrelated, which is necessary in a MIMO system. The signals comprise MIMO communication streams.

Each antenna radiation lobe 7, 8, 9, 10 is associated with a certain MIMO communication stream. When an information stream is to be transmitted, the information stream is fed into the base station 1, and to the antennas via, in this embodiment example, a Butler matrix 11. Lobe forming may of course be achieved in many other ways than by means of said Butler matrix 11. The input ports of the Butler matrix 11 divides the information stream to each one of the four antennas 3, 4, 5, 6 in such a way that the four antenna lobes 7, 8, 9, 10 are provided, each antenna lobe transmitting a certain information stream. Thus four information streams are transmitted via the four corresponding antenna lobes 7, 8, 9, 10, which four information streams then are uncorrelated.

In the first embodiment example, one user equipment (UE) 12 is positioned within the cell 2, where the user equipment 12 for example is a mobile phone or a portable computer. The UE 12 may also comprise a central antenna for a wireless local area network (WLAN) or similar. It is assumed that the UE 12 is arranged for reception of four uncorrelated signals, in other words it its assumed that the UE is equipped with four independent antenna functions (not shown). Those antenna functions achieves four UE antenna radiation lobes 12a, 12b, 12c, 12d.

Between the base station 1 and the UE 12, a number of obstacles 13, 14, 15, 16, 17 are positioned, which obstacles 13, 14, 15, 16, 17 in this example are constituted by buildings. These buildings 13, 14, 15, 16, 17 affect the communication between the base station 1 and the UE 12 in such a way that the communication's signal to noise ratio (SNR) is deteriorated. This means that the quality of the communication channel is poor, resulting in missing data and presumably a lot of re-transmissions.

According to the invention, the wireless communication system (C) further comprises at least one repeating transmitter/receiver (repeater) 18, 19, 20, 21, which repeater 18, 19, 20, 21 is placed between the base station 1 and the UE 12 in order to improve the communication channel by extending the coverage for the base station antenna lobes 7, 8, 9, 10. The at least one repeater 18, 19, 20, 21 is preferably placed in such a way that is has a free line of sight to the base station 1, resulting in that the transmission between the base station 1 and the at least one repeater 18, 19, 20, 21 is of a good quality.

Figure 2:
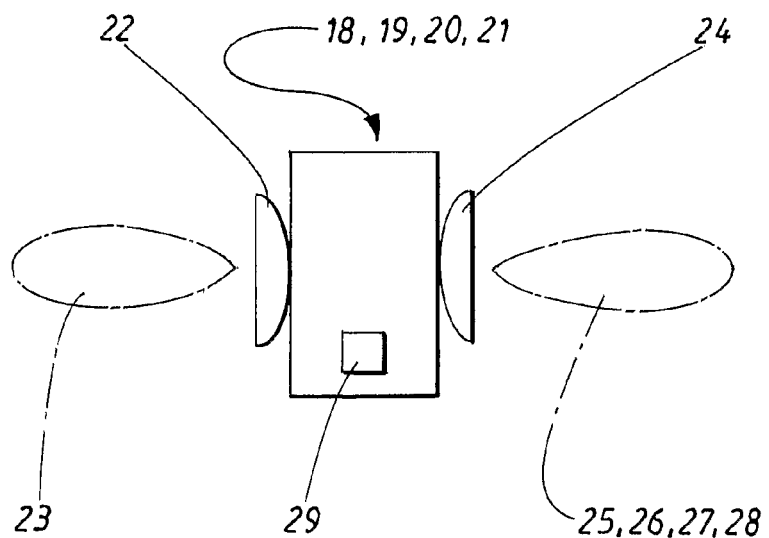
FIG. 2 shows an alternative repeater according to a second embodiment.

According to the first embodiment example with reference to both FIG. 1 and FIG. 2, a first 18, second 19, third 20 and fourth 21 repeater is used, each one being arranged with a first repeater antenna 22 which has a first radiation lobe 23 (not shown in FIG. 1) that is fixedly aimed at the base station (1). This antenna radiation lobe 23 is preferably of a narrow type, being arranged for communication via one of the base station antenna lobes 7, 8, 9, 10. Each repeater 18, 19, 20, 21 is also equipped with a second repeater antenna 24, which is arranged to produce a relatively wide radiation lobe 25, 26, 27, 28 that is aimed in such a way that it covers environments which are difficult to cover by means of the base station 1 alone, due to the buildings. The repeaters 18, 19, 20, 21 are placed at strategic positions, allowing a free line of sight to the base station 1 and the coverage of said environments.

When an information stream is going to be transmitted from the base station 1 to the UE 12, each one of the base station antenna lobes 7, 8, 9, 10 carries a certain part of the original information stream to a corresponding repeater 18, 19, 20, 21. In the example, the first base station antenna lobe 7 is received by the first antenna 22 of the first repeater 18, the second base station antenna lobe 8 is received by the first antenna 22 of the second repeater 19 and so on.

The second antennas 24 of the repeaters 18, 19, 20, 21 then re-transmit the received respective information streams in such a way that the UE 12 now may have access to all four information streams, having good, or at least acceptable, SNR values. Those re-transmitted information streams are essentially uncorrelated. As stated previously, it has been assumed that the UE is equipped with four independent antenna functions, i.e. the same number as the number of transmitted information streams.

Should the UE 12 be equipped with lesser antenna functions than the number of transmitted information streams, a control unit (not shown) in the system detects that all information streams are not received by the UE 12. The control unit then turns off that/those information stream/s, which are not received. The UE 12 may be equipped with any number of antenna functions, but in order for the UE 12 to be arranged for a MIMO system, it is necessary that the UE 12 is equipped with at least two antenna functions. The UE 12 may be equipped with adaptive antennas, which antennas are electrically controllable, for example by means of phase steering, towards the direction where the best transmission is achieved. The UE 12 may also be equipped with means (not shown) for determining which orientation of the UE 12 that provides the best communication properties.

In a second preferred embodiment, also implemented with reference to FIGS. 1 and 2, at least one repeater 18, 19, 20, 21 is arranged with an adaptive second antenna 24. That means that the antenna radiation lobe 25, 26, 27, 28 of the second antenna 24 is electrically controllable, for example by means of phase steering, and where that lobe 25, 26, 27, 28 is relatively narrow and controlled in such a way that the best possible transmission to the UE is achieved, the information streams still being essentially uncorrelated. The repeater 18, 19, 20, 21 is thus equipped with means 29 for determining the transmission quality for different directions of the antenna lobe 25, 26, 27, 28 in question. If there is more than one UE 12 in the cell 2, the controllable 25, 26, 27, 28 lobe may switch between the UE:s 12.

Figure 3:
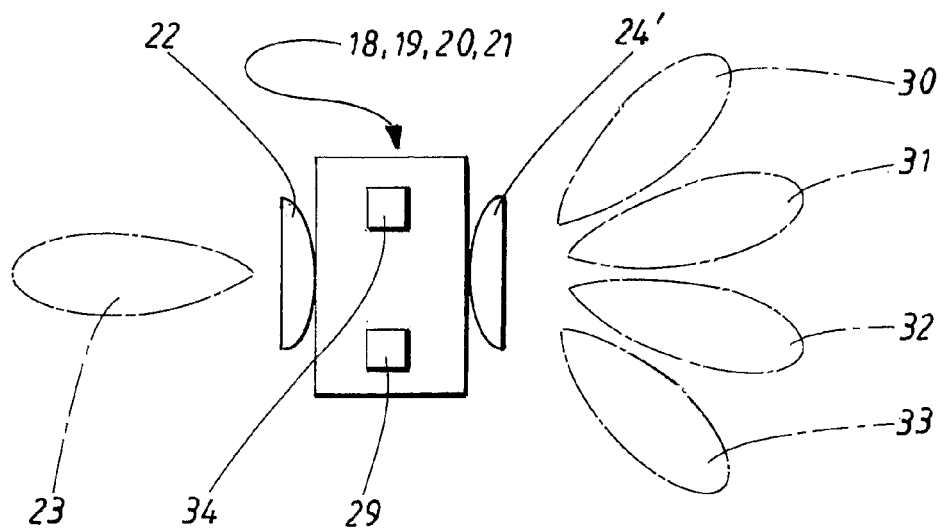
FIG. 3 shows an alternative repeater according to a third embodiment.

In a third preferred embodiment, with reference to FIG. 3, at least one repeater 18, 19, 20, 21 is arranged with a multilobe second antenna 24'. That means that the second antenna 24' produces a plurality of antenna radiation lobes 30, 31, 32, 33 pointing in different directions in azimuth, elevation or both, for example by means of a Butler matrix 34. The radiation lobes 30, 31, 32, 33 may also be fixed and electrically controllable in such a way that it is possible to individually switch the antenna radiation lobes 30, 31, 32, 33 on and off.

These lobes may also be electrically controllable in the same way as described previously, with reference to the second preferred embodiment, the at least one repeater 18, 19, 20, 21 further being equipped with means 29 for determining the transmission quality for the different antenna lobes 30, 31, 32, 33. If there is more than one UE 12 in the cell, such controllable lobes 30, 31, 32, 33 may switch between the UE:s 12, or, alternatively, different lobes 30, 31, 32, 33 may be steered towards different UE:s 12.

In the third embodiment example above, four antenna radiation lobes 30, 31, 32, 33 are shown. The multilobe second antenna 24' should, however, produce at least two radiation lobes.

The invention is not limited to the embodiments described above, but may vary freely within the scope of the appended claims. For example, the base station antenna radiation lobes 7, 8, 9, 10 may be electrically controllable, for example by means of phase steering, making the base station 1 adaptive. It is of course also conceivable that the repeaters' 18, 19, 20, 21 first antenna 22 has a radiation lobe 23 that is electrically controllable, for example by means of phase steering, providing an adaptation for the best possible communication with the base station 1.

The base station 1 antennas 3, 4, 5, 6 may also be dual polarized, each base station antenna 3, 4, 5, 6 being arranged for communication via two essentially orthogonal polarizations, thus doubling the information stream transmission rate. In this application, an antenna radiation lobe is defined as having one polarization, a dual polarized antenna thus being defined as producing one antenna radiation lobe for each polarization.

Furthermore, a direction of an antenna radiation lobe in azimuth is defined as the angle between a normal extending from the centre of the antenna's main radiating surface and the azimuth direction of the antenna radiation lobe. A corresponding definition is valid for an elevation directional angle of an antenna radiation lobe. The direction of an antenna radiation lobe is preferably defined as the direction where the antenna radiation lobe has its maximum signal, other definitions occur.

Since all antenna arrangements are reciprocal, all features described as concerning transmission, are also applicable concerning reception.

The number of base station antennas 3, 4, 5, 6, base station lobes 7, 8, 9, 10 and repeaters 18, 19, 20, 21 may vary in any convenient way, provided that the system still is arranged for MIMO, i.e. the number of base station antennas 3, 4, 5, 6 and base station lobes 7, 8, 9, 10 must be at least two. There may be more or less repeaters 18, 19, 20, 21 than there are base station antenna lobes 7, 8, 9, 10. In a basic configuration, only one repeater is used.

In FIG. 1, a fifth repeater 30 is shown. The fifth repeater 30 provides an alternative extended coverage for the fourth base station antenna lobe 10.

As indicated above, the invention is applicable for an arbitrary number of UE:s 12. More than one base station 1 may also be necessary, for example due to the demands for capacity and/or the layout of the cell 2 environments.

As stated previously, the UE 12 may be equipped with any number of antenna functions, but in order for the UE 12 to be arranged for a MIMO system, it is necessary that the UE 12 is equipped with at least two antenna functions.

Furthermore, the described use of Butler matrixes 11, 34 is not to be regarded as limiting in any way for the invention. Other types of lobe-forming is of course conceivable, for example by means of digital beam-forming.

At least one of the repeaters may be arranged for creating diversity in previously known ways. Such diversity may be of the type time, frequency or phase diversity. Furthermore, by letting the second antenna 24 comprise at least two separate spatially separated antenna elements (not shown), space and pattern diversity may be obtained.

In the examples, it has been assumed that FDD (Frequency Division Duplex) has been used, i.e. the same frequency band has been used for uplink and another frequency band for downlink. It is of course possible to use TDD (Time Division Duplex) instead, i.e. using the same frequency band for both uplink and downlink, but separating the downlink and uplink transmissions in time. The repeaters may be arranged for either FDD or TDD, or even both.

The repeaters may be of a passive or an active type.

The invention claimed is:

1. A wireless communication system comprising at least one base station in a communication cell, from which base station at least two essentially uncorrelated antenna radiation lobes are formed, each antenna radiation lobe communicating a MIMO (Multiple Input Multiple Output) communication stream, where the system further comprises at least one repeating transmitter/receiver (repeater), the at least one repeater being arranged for communicating one of the MIMO communication streams to and/or from at least one UE (user equipment) the UE being equipped with at least two essentially uncorrelated antenna functions, where each repeater is arranged with a first repeater antenna, which has a first radiation lobe and is arranged for communicating with said base station, and a second repeater antenna which is arranged for communicating with said UE, where at least one antenna radiation lobe of the second antenna of at least one repeater is electrically controllable, and where that antenna radiation lobe is relatively narrow and controlled in such a way that the best possible transmission with to the UE is achieved, the information streams still being essentially uncorrelated.

2. The wireless communication system (C) according to claim 1, wherein at least one repeater is arranged with a multilobe second antenna producing at least two antenna radiation lobes pointing in different directions in azimuth, elevation or both.

3. The wireless communication system (C) according to claim 1, wherein the communication system is arranged with one frequency band for uplink and another frequency band for downlink.

4. The wireless communication system according to claim 1, wherein the at least one repeater is placed in such a way that it has a free line of sight to the base station.

5. The wireless communication system according to claim 1, wherein each MIMO communication stream is communicated by means of a certain corresponding repeater, each repeater being associated with one of the MIMO communication streams.

6. The wireless communication system according to claim 5, wherein at least one repeater's first antenna has an electrically controllable radiation lobe.

7. The wireless communication system according to claim 1, wherein the first antenna radiation lobe is relatively narrow and is fixedly aimed at the base station, being arranged for communication via one of the base station antenna radiation lobes.

8. The wireless communication system according to claim 1, wherein at least one repeater is arranged for creating diversity of any of the types: time, frequency or phase diversity.

9. The wireless communication system according to claim 1, wherein the base station antenna radiation lobes are electrically controllable.

10. The wireless communication system according to claim 1, wherein the base station antennas are dual polarized, each base station antenna being arranged for communication via two essentially orthogonal polarizations.

11. The wireless communication system according to claim 1, characterized in that lobe-forming is achieved by means of Butler matrixes or digital beam-forming or both.

* * * * *